United States Patent
Madhani

(10) Patent No.: US 9,471,833 B1
(45) Date of Patent: Oct. 18, 2016

(54) CHARACTER RECOGNITION USING IMAGES AT DIFFERENT ANGLES

(75) Inventor: Sunil H. Madhani, Karnataka (IN)

(73) Assignee: INTUIT INC., Mountain View, CA (US)

( * ) Notice: Subject to any disclaimer, the term of this patent is extended or adjusted under 35 U.S.C. 154(b) by 861 days.

(21) Appl. No.: 13/438,589

(22) Filed: Apr. 3, 2012

(51) Int. Cl.
| | |
|---|---|
| G06K 9/00 | (2006.01) |
| H04N 1/387 | (2006.01) |
| H04N 1/203 | (2006.01) |
| G06K 9/32 | (2006.01) |
| G06K 9/36 | (2006.01) |
| G06K 9/20 | (2006.01) |
| G06K 9/22 | (2006.01) |
| H04N 1/00 | (2006.01) |

(52) U.S. Cl.
CPC ....... *G06K 9/00436* (2013.01); *G06K 9/00422* (2013.01); *G06K 9/20* (2013.01); *G06K 9/32* (2013.01); *G06K 9/3208* (2013.01); *G06K 9/3216* (2013.01); *G06K 9/3275* (2013.01); *G06K 9/36* (2013.01); *H04N 1/2036* (2013.01); *H04N 1/3876* (2013.01); *H04N 1/3877* (2013.01); *H04N 1/3878* (2013.01); *G06K 2009/2045* (2013.01); *G06K 2009/363* (2013.01); *G06K 2009/366* (2013.01)

(58) Field of Classification Search
CPC .......... G06K 9/22; G06K 9/228; G06K 9/32; G06K 9/3216; G06K 9/3233; G06K 9/3241; G06K 9/3275; G06K 9/3283; G06K 9/3291; H04N 5/32; H04N 5/14; H04N 5/225; H04N 5/23248; G02B 27/017; G02B 2027/0178; G09G 2340/0435
See application file for complete search history.

(56) References Cited

U.S. PATENT DOCUMENTS

| | | | | |
|---|---|---|---|---|
| 5,828,782 A * | 10/1998 | Sunakawa | .......... | G06K 9/00456 375/E7.145 |
| 6,211,913 B1 * | 4/2001 | Hansen | .............. | H04N 5/23248 348/218.1 |
| 7,194,144 B1 * | 3/2007 | Sakai et al. | ................... | 382/284 |
| 7,787,693 B2 * | 8/2010 | Siegemund | ................... | 382/176 |
| 2002/0021364 A1 * | 2/2002 | Asada | ..................... | H04N 5/232 348/312 |
| 2003/0174769 A1 * | 9/2003 | Nagumo | .............. | H04N 19/105 375/240.02 |
| 2003/0219146 A1 * | 11/2003 | Jepson | ..................... | G06K 9/32 382/103 |
| 2006/0017810 A1 * | 1/2006 | Kurzweil et al. | .......... | 348/207.1 |
| 2006/0125921 A1 * | 6/2006 | Foote | .................... | G06T 3/4038 348/159 |
| 2006/0262959 A1 * | 11/2006 | Tuzel | ................. | G06K 9/00711 382/103 |
| 2007/0076982 A1 * | 4/2007 | Petrescu | ................ | H04N 5/144 382/294 |
| 2008/0158365 A1 * | 7/2008 | Reuter | ..................... | G06K 9/20 348/207.1 |
| 2008/0158371 A1 * | 7/2008 | Trescott | ................ | G03B 17/00 348/208.7 |

(Continued)

*Primary Examiner* — David N Werner
(74) *Attorney, Agent, or Firm* — Patterson & Sheridan, LLP

(57) ABSTRACT

During this information-extraction technique, a user of the electronic device may be instructed by an application executed by the electronic device (such as a software application) to point an imaging sensor, which is integrated into the electronic device, at a location on a document. For example, the user may be instructed to point a cellular-telephone camera at a field on an invoice. After providing the instruction and before the user activates an image-activation mechanism associated with the imaging device, the electronic device captures multiple images of the document by communicating a signal to the imaging device to acquire the images. Then, the electronic device stores the images with associated timestamps and spatial-position information, which is provided by a sensor which is integrated into the electronic device. After the user activates the image-activation mechanism, the electronic device analyzes the images to extract the information proximate to the location on the document.

17 Claims, 4 Drawing Sheets

(56) References Cited

U.S. PATENT DOCUMENTS

2010/0066851 A1* 3/2010 Pooley ................ H04N 5/2252
  348/222.1
2010/0165087 A1* 7/2010 Corso ...................... G06K 9/32
  348/65
2013/0106674 A1* 5/2013 Wheeler .............. G02B 27/017
  345/8
2013/0148862 A1* 6/2013 Roach ................... G06Q 40/02
  382/112
2013/0155474 A1* 6/2013 Roach et al. ................. 358/505

* cited by examiner

CHARACTER RECOGNITION USING IMAGES AT DIFFERENT ANGLES

CROSS REFERENCE TO RELATED APPLICATIONS

This application is related to U.S. patent application Ser. No. 13/431,559, entitled "Accurately Extracting Information Using Multiple Images," by Sunil H. Madhani et al., which was filed on 27 Mar. 2012; and U.S. patent application Ser. No. 13/427,461, entitled "Accurately Extracting Information Based on Orthogonal Images," by Sunil H. Madhani et al., which was filed on 22 Mar. 2012, the contents of both of which are herein incorporated by reference.

BACKGROUND

The present disclosure relates to techniques for capturing multiple images of a document and accurately extracting information from the images.

The widespread availability of digital cameras and cellular telephones with integrated imaging sensors has led to a significant increase in digital photography and associated software applications that leverage information in the acquired images. For example, after a user captures an image of a document (such as a financial document) using a digital camera or a cellular telephone (which are each sometimes referred to as an 'electronic device'), a software application executing on the electronic device (such as a financial software application) can extract information from the image using optical character recognition. Then, at least in principle, the financial software application can use the extracted information to populate fields in a form or to perform a financial calculation.

However, in practice, the ability to extract useful information from an image (especially for use with a software application) is often restricted by the image quality. For example, depending on the image quality, errors may occur when extracting the information using optical character recognition. These errors can make it more difficult, if not impossible, for a software application (such as the financial software application) to subsequently use the extracted information.

As a consequence, after acquiring an image, the user may need to perform post-acquisition operations, such as: editing the image to crop the area of interest; correcting any errors that occurred in the extracted information; and, if the image is blurry or the area of interest was not captured, repeating the image-capture and/or the post-acquisition operations one or more times. Performing the image-capture and/or the post-acquisition operations once, let alone multiple times, is time-consuming and may consequently limit the willingness of users to acquire images or to use software applications that leverage the information in images.

SUMMARY

The disclosed embodiments relate to an electronic device that extracts information from a document. During operation, the electronic device (or an application executing on the electronic device) provides an instruction to a user to point an imaging device, which is integrated into the electronic device, at a location on the document. After providing the instruction and before the user activates an image-activation mechanism associated with the imaging device (such as a physical button or a virtual icon for activating the imaging sensor), i.e., during a time interval between the user getting ready to position the imaging device at the appropriate location and the user actually taking a picture, the electronic device captures multiple images of the document. Moreover, the electronic device stores the images with associated timestamps and spatial-position information, which is provided by a sensor which is integrated into the electronic device. Then, the electronic device receives a signal indicating that the user activated the image-activation mechanism. In response to the signal, the electronic device analyzes one or more of the images to extract the information proximate to the location on the document.

Note that an image capture rate of the imaging sensor may be based on the spatial-position information. Furthermore, the sensor may include: an accelerometer and/or a gyroscope. Therefore, the spatial-position information may include position information and/or orientation information.

In some embodiments, the images are captured without the user's knowledge.

Moreover, the analysis may include optical character recognition. Additionally, the document may include a financial document (such as: an invoice, a bill and/or a financial vehicle) and/or the application may include a financial application.

In some embodiments, the electronic device erases the one or more images after performing the analysis. For example, a given image may be erased when spatial-position information associated with the location differs from given spatial-position information associated with the given image by a predefined amount.

Furthermore, a contribution of a given image in the one or more images in the analysis may be based on a corresponding weight. This weight may be based on a difference between the given spatial-position information associated with the given image and spatial-position information of the location. For example, the weight may be larger when the distance is smaller. Alternatively or additionally, the weight may be based on differences between the information extracted from the given image and the other images and/or differences in the timestamps associated with the images.

In some embodiments, the analysis is based on historical information previously extracted from other documents.

Another embodiment provides a method that includes at least some of the operations performed by the electronic device.

Another embodiment provides a computer-program product for use with the electronic device. This computer-program product includes instructions for at least some of the operations performed by the electronic device.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Embodiments of an electronic device, a technique for extracting information, and a computer-program product (e.g., software) for use with the electronic device are described. During this information-extraction technique, a user of the electronic device may be instructed by an application executed by the electronic device (such as a software application) to point an imaging sensor, which is integrated into the electronic device, at a location on a document. For example, the user may be instructed to point a cellular-telephone camera at a field on an invoice. After providing the instruction and before the user activates an image-activation mechanism associated with the imaging device (such as a physical button or a virtual icon for activating the imaging sensor), i.e., during a time interval between the user getting ready to position the imaging device at the appropriate location and the user actually taking a picture, the electronic device captures multiple images of the document by communicating a signal to the imaging device to acquire the images. For example, the images may be acquired at different frame rates and at different angles during the time interval. Then, the electronic device stores the images with associated timestamps and spatial-position information, which is provided by a sensor which is integrated into the electronic device. After the user activates the image-activation mechanism, the electronic device analyzes at least some of the images to extract the information proximate to the location on the document.

By facilitating accurate extraction of the information, the information-extraction technique may simplify the use of the imaging sensor, the application and, thus, the electronic device. In the process, the information-extraction technique may significantly improve the user experience when using the application and the electronic device, thereby increasing customer satisfaction, and sales of the application and the electronic device.

In the discussion that follows, a user may include: an individual (for example, an existing customer, a new customer, a service provider, a vendor, a contractor, etc.), an organization, a business and/or a government agency. Furthermore, a 'business' should be understood to include: for-profit corporations, non-profit corporations, organizations, groups of individuals, sole proprietorships, government agencies, partnerships, etc.

Figure 1:
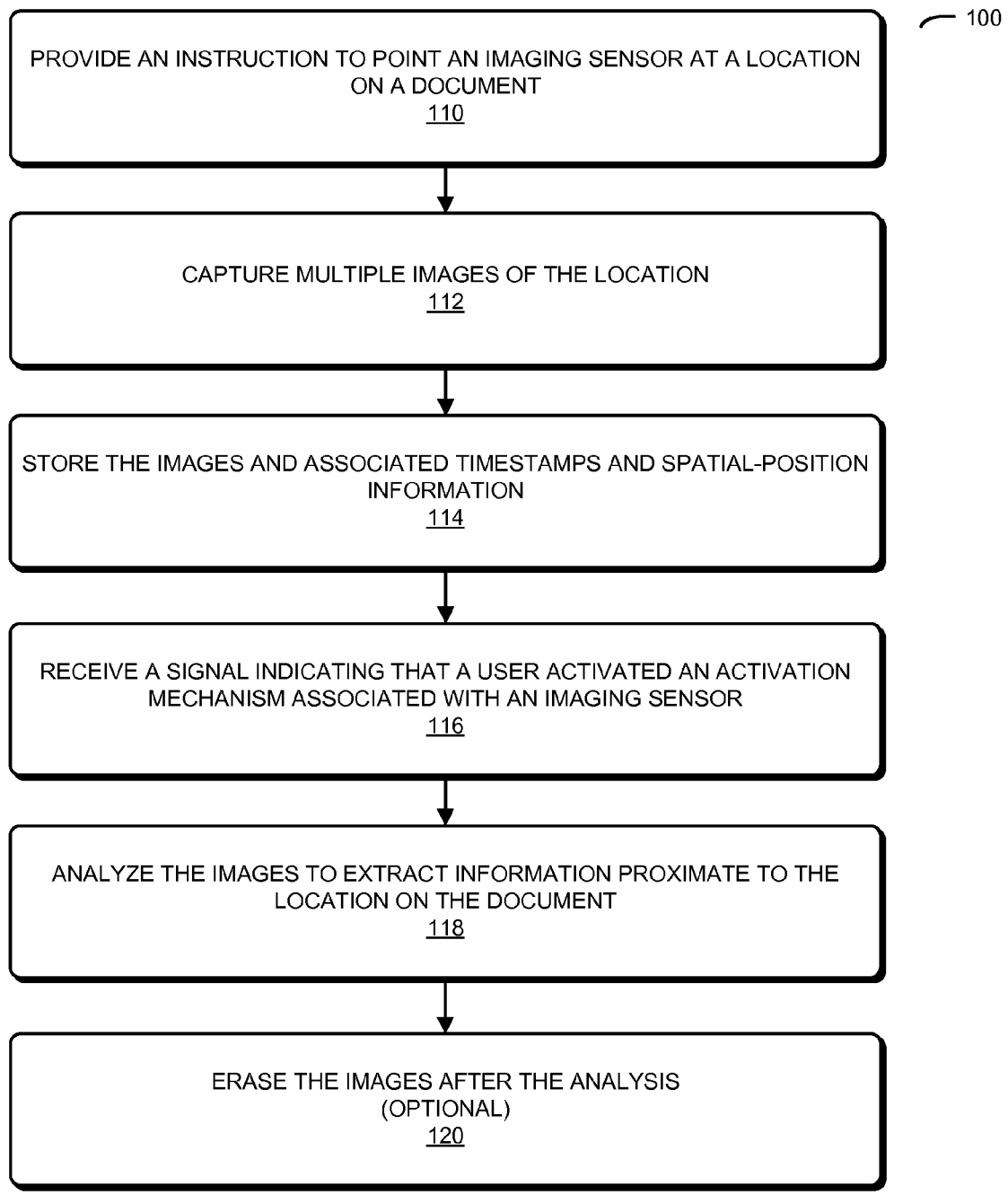
FIG. 1 is a flow chart illustrating a method for extracting information in accordance with an embodiment of the present disclosure.
Figure 3:
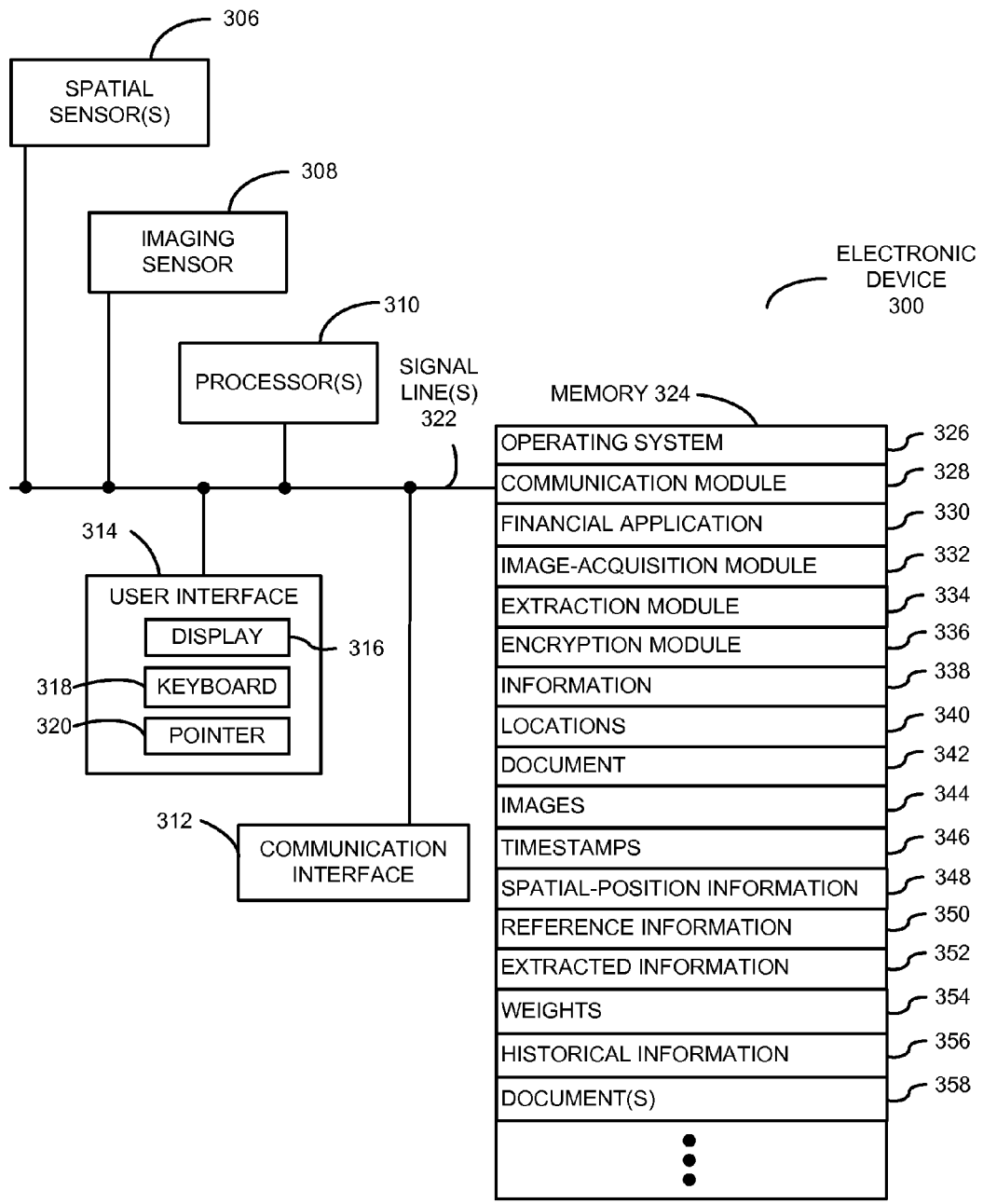
FIG. 3 is a block diagram illustrating an electronic device that performs the method of FIG. 1 in accordance with an embodiment of the present disclosure.

We now describe embodiments of the information-extraction technique, which may be performed by an electronic device (such as electronic device 300 in FIG. 3). FIG. 1 presents a flow chart illustrating a method 100 for extracting information. During operation, the electronic device (or an application executing on the electronic device) provides an instruction to a user to point an imaging device, which is integrated into the electronic device, at a location on a document (operation 110). For example, the document may include a financial document (such as: an invoice, a paycheck, a bill, a W-2 form and/or a financial vehicle) and/or the application may include a financial application. Therefore, the location may include a field with: an account number, an amount due, and/or a due date.

After providing the instruction and before the user activates an image-activation mechanism associated with the imaging device (such as a physical button or a virtual icon for activating the imaging sensor), the electronic device captures multiple images of the document (operation 112), where each of the images may have a different angle (or orientation) and/or a different spatial position. Note that an image capture rate of the imaging sensor may be based on spatial-position information, such as spatial-position information associated with a sensor, e.g., an accelerometer and/or a gyroscope, which is integrated in the electronic device. (Therefore, the spatial-position information may include a position and orientation in a coordinate system, such as x, y, and z, and associated angles $\theta$, $\alpha$, $\gamma$, and/or accelerations along one or more axes.) For example, the image capture rate may be larger when the spatial-position information is varying rapidly (i.e., when the point of interest or center of the field of view of the imaging sensor is changing), and may be smaller when the spatial-position information is approximately stable.

The spatial-position information may be considered approximately stable when it remains within a predefined range for a predefined time duration, e.g., changes in spatial position of the electronic device are less than 5-10% for 0.5-2 s. Alternatively or additionally, approximate stability may occur when a focus level or focal length (which is a measure of how strongly an optical system converges or diverges light) of the imaging device is stable, e.g., when the focus level remains within a predefined range for a predefined time duration (such as within 5-10% of accurate focus for 1-2 s). By leveraging the spatial-position information and/or such a metric of stability, the images may be acquired without the user's knowledge.

Furthermore, the electronic device stores the images with associated timestamps (which may be specified by a system clock) and the spatial-position information (operation 114). For example, the images, the timestamps and the spatial-position information may be stored in a computer-readable memory.

Then, the electronic device receives a signal indicating that the user activated the image-activation mechanism (operation 116). In response to the signal, the electronic device analyzes one or more of the images to extract the information proximate to the location on the document (operation 118).

Note that the analysis may include optical character recognition. Moreover, a contribution of a given image in the analysis may be based on a corresponding weight. As described further below with reference to FIG. 2, this weight may be based on a distance between the given spatial-position information associated with the given image and spatial-position information of the location. For example, the weight may be larger when the distance is smaller. Alternatively or additionally, the weight may be based on differences between the information extracted from the given image and the other images and/or differences in the timestamps associated with the images.

In some embodiments, the analysis is optionally based on historical information previously extracted from other documents. For example, if similar information has been previously extracted from another instance of the document, then this previously extracted information can be used during the analysis to identify and/or to correct an error(s). Thus, if the document is a paycheck, the employer name, which was extracted from a previous paycheck, may be used to correct an error that occurred during extraction of the employer name from the current paycheck.

Moreover, in some embodiments the electronic device optionally erases the images after performing the analysis (operation 120). For example, a given image may be erased when spatial-position information associated with the location differs from given spatial-position information associated with the given image by a predefined amount. In particular, if the given image is 9-11 cm distant from the location, the given image may be erased.

In some embodiments of method 100, there may be additional or fewer operations. Moreover, the order of the operations may be changed, and/or two or more operations may be combined into a single operation.

By capturing and using multiple images to extract the information proximate to the location on the document, the information-extraction technique can improve the accuracy of the extracted information by 50%, and can reduce the time needed to complete the process by 67%. Therefore, the information-extraction technique can significantly improve the user experience when using the application and the electronic device.

In an exemplary embodiment, the information-extraction technique leverages the capabilities of digital cameras and imaging sensors in cellular telephones to acquire multiple images of a location while the orientation or angle of the digital camera is changing. These images may be acquired without user action (i.e., before the user activates or presses a physical button, a virtual icon or an image-activation mechanism associated with an imaging sensor that is normally used to take pictures). In particular, as the user is pointing the imaging sensor toward a location on a document (such as a field in an invoice or a check), multiple images may be acquired. In some embodiments, the resulting images may be presented to the user who provides feedback on the image quality. If one or more images are blurry or the desired information at one of the locations is absent (for example, if the information isn't included in the image), the images may be re-acquired.

Subsequently, information in at least some of the images can be extracted using optical character recognition, and the extracted information may then be used by a financial software application such as a remote-check-deposit application or income-tax software. To facilitate this analysis, the view finder or the image-capture zone associated with the imaging sensor (as specified by the application) may be adjusted when the images are acquired. For example, the view finder or the image-capture zone may be adjusted based on a size of a field associated with a given location. This field may be predefined so that the desired information associated with the given location is captured in the corresponding images. For example, if the given location is an account number, the field may be a rectangular block or region that includes the account number, and the view finder or the image-capture zone may be adjusted accordingly so that the account number is included in at least some of the images. However, if the location is an address, the view finder may display a larger square to cover the three or four lines in a typical address field. In conjunction with acquiring multiple images, this adjustment of the view finder may improve the accuracy of the extracted information and, thus, may significantly increase user satisfaction when using the application.

During operation of the application, the application executing on the electronic device may display or present the view finder on a screen or a display of the electronic device. In response to instructions from the application, such as a verbal prompt or a message displayed on the screen, the user may point the imaging sensor toward a location or an area of interest (e.g., an account number), and this area may be displayed in the view finder on the screen. Then, the application and/or the electronic device may provide a signal to the imaging sensor, which then takes multiple pictures of the area of interest, each of which may have an associated timestamp and spatial-position information (such as spatial-position information associated with a sensor, e.g., an accelerometer and/or a gyroscope, which is integrated in the electronic device). Note that an image capture rate of the imaging sensor may be based on the spatial-position information. For example, the image capture rate may be larger when the spatial-position information is varying, and may be smaller when the spatial-position information is approximately stable.

In some embodiments, even if ambient light is sufficient to acquire the images, the application may also activate an integrated flash or light to increase the quality of the image. Thus, the flash may be selectively triggered by the application and/or the electronic device based on a focus level that corresponds to a focus of the imaging sensor and/or the exposure setting. This may make subsequent extraction of information in the images simpler and/or more accurate.

In an exemplary embodiment, a customer (John) uses the application to pay a bill. When John receives a physical bill, he may activate the application (which is sometimes referred to as 'Flashpay') on his cellular telephone. In response to displayed instructions, John may center an account number on the bill in the view finder shown on the screen of the cellular telephone. As John does this, Flashpay may instruct or signal the imaging sensor to take multiple, different pictures or to acquire multiple, different images of the region as the orientation of the cellular telephone (and, thus, the imaging sensor) changes. Note that an image capture or sampling rate of the imaging sensor may be based on spatial-position information. For example, the image capture rate may be larger when the spatial-position information is varying, and may be smaller when the spatial-position information is approximately stable (thus, the frame or image-capture rate may be dynamically adjusted based on the spatial-position information). In particular, the image-capture rate may vary linearly with speed, from 2 frames/s at a speed of 2 cm/s to 15 frames/s at a speed of 15 cm/s. As noted previously, Flashpay may also enable or disable the flash based on the focus level and/or the exposure setting.

After the images have been acquired, Flashpay may process the images using optical character recognition. For example, by combing scanned text (and, more generally, extracted information) from some or all of the images (which may leverage relative timestamps, relative differences between the spatial-position information of the images and the spatial-position information of the location, relative distances of points of interest of the images from the location, and/or historical data), FlashPay may predict the correct result with a high certainty.

After the information is extracted, Flashpay may show the resulting text to John. If he feels that this is not the data that was needed, John can re-point the imaging sensor at the object, which will result in another series of images being acquired. Moreover, John may repeat the aforementioned operations for other locations on the bill, such as locations corresponding to: the address of the biller, the bill due date, and the amount billed. Once Flashpay has processed the images, it may have all the information needed to pay the bill.

Note that in the preceding example John did not have to take a picture of the whole bill and he did not have to send the images for remote processing. Instead, by acquiring multiple images, his cellular telephone was able to perform the optical character recognition to extract the desired information.

In another exemplary embodiment, $T_1$ is the timestamp when Flashplay asks the user to point a camera in a smartphone at document; $T_2$ is the timestamp when the user moves the camera over the document; $T_3$ is the timestamp when the user makes finer-movement adjustments of the camera to get a clear view of the area of interest in the document; $T_4$ is the timestamp when the user activates an image-activation mechanism associated with the camera to take a picture; and $T_5$ is when the user usually moves the camera to pursue the next requested action or operation.

With these definitions in mind, from time $T_1$ to time $T_2$, Flashplay may acquire or take multiple pictures at a lower frame capture rate (the user may not aware of this); from time $T_2$ to $T_3$, Flashplay may take multiple pictures at a higher frame capture rate (once again, the user may not be aware of this); from time $T_3$ to $T_4$, Flashplay may take multiple pictures at a lower frame capture rate (the user may not be aware of this); and from $T_4$ to $T_5$, Flashplay may take multiple pictures at a higher frame capture rate of a fixed interval (the user may not be aware of this). After completing these operations, the smartphone may store the images with associated timestamps and spatial-position information, which is provided by a sensor that is integrated into the smartphone. Furthermore, after the user activates the image-activation mechanism, the smartphone may analyze at least some of the images to extract the information proximate to the location on the document. Note that each of the frames that is stored may have an associated timestamp (which may be provided by a clock), linear coordinates (which may be provided by an accelerometer) and angular coordinates (which may be provided by a gyroscope).

Thus, the smartphone may collect a set of images that are taken from different angles in a given plane even though the user believes that only one picture was taken. Because each of the images has an associated timestamp and linear and angular data, images where the linear and angular data overlap a certain exposure and which are taken at different times may be fed into an optical-character-recognition engine. The results of the optical-character-recognition analysis of the image acquired by user may be compared with the optical-character-recognition analysis of the images taken from different angles. If the optical-character-recognition results differ, then an error may be predicted. In this case, rectified text with a high certainty may be computed from images having a finer (or smaller) range of linear and angular data. These images may have been acquired at timestamps before, during and after the timestamp when the user acquired the picture. In the optical-character-recognition analysis, weights may be assigned based on the certainty (or probability). In turn, note that the certainty or probability may be based on the proximity of the linear, angular and timestamp data with the linear, angular and timestamp data of the image or picture acquired by the user.

Figure 2:
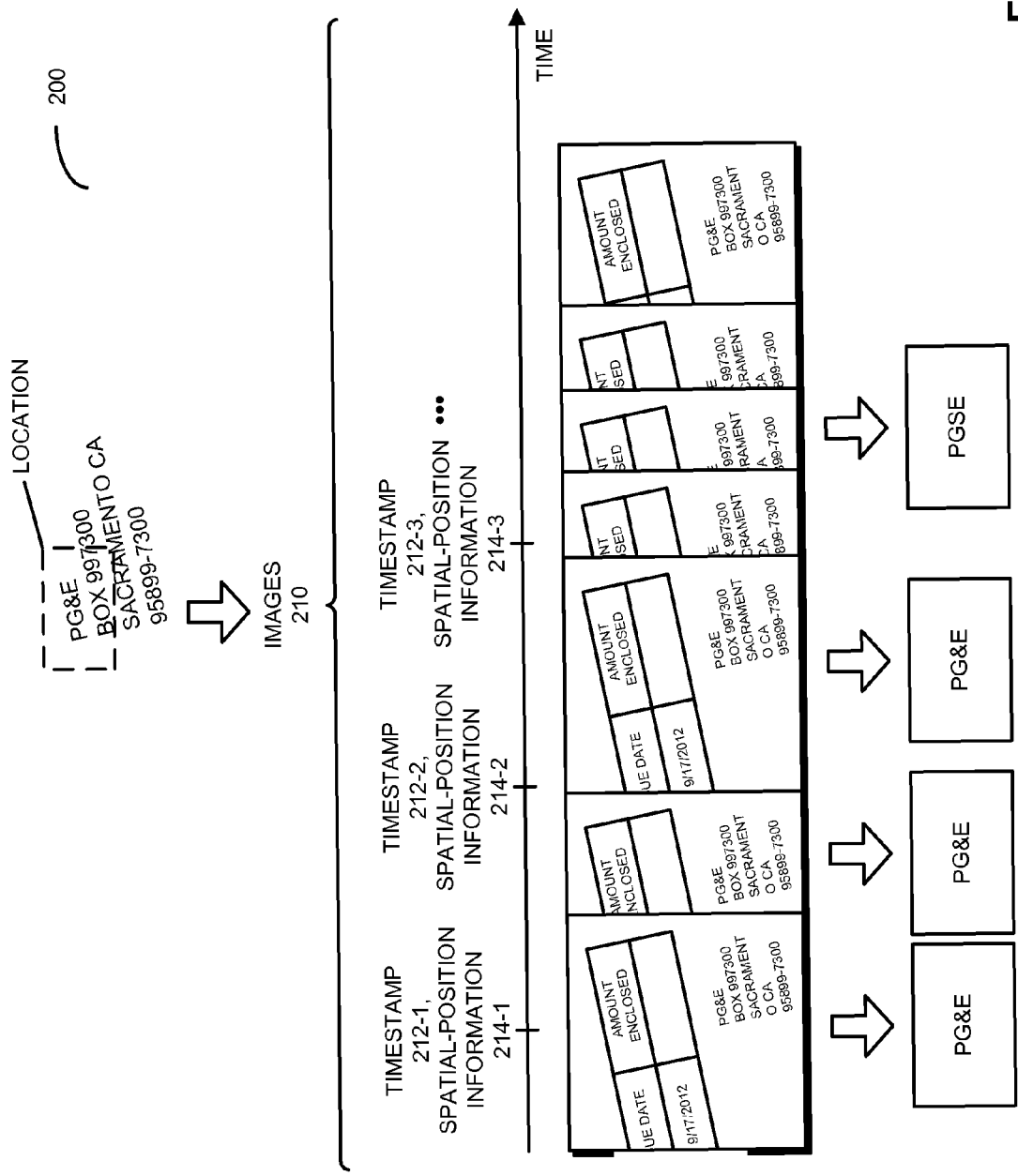
FIG. 2 is a drawing illustrating the method of FIG. 1 using multiple images of a document in accordance with an embodiment of the present disclosure.

We now describe extraction of the information using the acquired images in more detail. FIG. 2 is a drawing 200 illustrating method 100 (FIG. 1) using multiple images 210 of a document. After the user is instructed to point the imaging sensor at the location, the imaging sensor may acquire images at a low image-capture rate. Then, when the imaging sensor is pointed at the document, the imaging sensor may acquire images at a higher image-capture rate. Furthermore, when the imaging sensor is approximately pointing at the location (i.e., when the user is making fine adjustments to the position), the imaging sensor may acquire images at a low image-capture rate. In addition, once the spatial-position information is approximately stable and the user activates the image-activation mechanism, the imaging sensor may acquire images at a higher image-capture rate. Note that each of images 210 may have an associated one of timestamps 212 and spatial-position information 214 (such as a linear position from an accelerometer and/or an angular position from a gyroscope).

When the user activates the image-activation mechanism, a reference timestamp and/or reference spatial-position information for the location may be stored. Then, an extraction module in the electronic device (such as an optical character recognition engine or module) may extract information from at least some of acquired images 210 (which are taken at different angles in a plane) using optical character recognition. In this process, timestamps 212 and spatial-position information 214 associated with images 210 may be used to determine which of images 210 are likely to be the best source of the extracted information (i.e., which can accurately provide the extracted information).

For example, if the extracted information from a given image (such as an image acquired when the user activated the image-activation mechanism) is different than the extracted information from other images, an error may be predicted and the extracted information from temporally and/or spatially adjacent images to the given image (or to the reference timestamp and/or the reference spatial-position information) may be used to determine the correct result. In particular, images having associated timestamps within a time interval of the reference timestamp (such as within approximately 0.5 s) may be used. (Thus, images at preceding times and/or subsequent times may be used.) Furthermore, images near the location (i.e., images having similar spatial-position information to the reference spatial-position information) may have larger weights (and, thus, larger contributions) in the analysis. Thus, if the location is at an angle of 56°, the corresponding weight in the analysis may be 1 at 56° and may decrease linearly to 0.1 at 100°.

In addition, historical data may be used to determine if there was a match previously (i.e., if the correct information was extracted previously or is known). If yes, the previous match may be used to identify and/or correct an error in the extracted information.

As shown in FIG. 2, if the information at the location is "PG&E" and the optical character recognition result from one image is "PGSE" and from other adjacent images is "PG&E," there is a high probability that the correct result is "PG&E." This result can also be validated against stored historical data. However, if this result was extracted for the first time, then it may be added to the historical data for future reference. In this way, the information extraction technique may facilitate the building of a data structure that, over time, can be used to improve the accuracy of extracted information.

Therefore, by using the extracted information from multiple images, the accuracy of the extracted information can be improved. In particular, the information-extraction technique can detect optical character recognition or human errors and make corrections. For example, a '5' may have been incorrectly extracted as an 'S,' an '8,' or a 'B.' However, by using multiple images and/or historical information, this error may be identified and corrected.

Note that even though multiple images 210 may be acquired, the user may think that only one image has been acquired because the user only pressed the image-activation mechanism once (for a given location). Therefore, the improved performance offered by the information-extraction technique may be surprising to the user, which may delight the user and increase their satisfaction.

FIG. 3 presents a block diagram illustrating an electronic device 300 that performs method 100 (FIG. 1). Electronic device 300 includes one or more processing units or processors 310, a communication interface 312, a user interface 314, and one or more signal lines 322 coupling these components together. Note that the one or more processors 310 may support parallel processing and/or multi-threaded operation, the communication interface 312 may have a persistent communication connection, and the one or more signal lines 322 may constitute a communication bus. Moreover, the user interface 314 may include: a display 316, a keyboard 318, and/or a pointer 320, such as a mouse.

Memory 324 in electronic device 300 may include volatile memory and/or non-volatile memory. More specifically, memory 324 may include: ROM, RAM, EPROM, EEPROM, flash memory, one or more smart cards, one or more magnetic disc storage devices, and/or one or more optical storage devices. Memory 324 may store an operating system 326 that includes procedures (or a set of instructions) for handling various basic system services for performing hardware-dependent tasks. Memory 324 may also store procedures (or a set of instructions) in a communication module 328. These communication procedures may be used for communicating with one or more computers and/or servers, including computers and/or servers that are remotely located with respect to electronic device 300.

Memory 324 may also include multiple program modules (or sets of instructions), including: financial application 330 (or a set of instructions), image-acquisition module 332 (or a set of instructions), extraction module 334 (or a set of instructions), and/or encryption module 336 (or a set of instructions). Note that one or more of these program modules (or sets of instructions) may constitute a computer-program mechanism.

During method 100 (FIG. 1), financial application 330 (and, more generally, an arbitrary software application) may be launched based on a user command. For example, the user may launch financial application 330 by clicking on a physical button in keyboard 318 or a virtual icon associated with financial application 330 that is displayed on display 316.

Then, financial application 330 provides information 338 (such as an instruction) to the user to point an imaging sensor 308, which is integrated into electronic device 300, to one of locations 340 on a document 342. For example, financial application 330 may present information 338 on display 316.

As the user moves electronic device 300 in response to information 338, image-acquisition module 332 may communicate a signal to imaging sensor 308 to acquire images 344. Each of images 344 may have an associated one of timestamps 346 and spatial-position information 348 (which may be provided by spatial sensor 306, e.g., an accelerometer and/or a gyroscope integrated in electronic device 300). Note that these images may be acquired without explicit action by the user, such as without the user activating an image-activation mechanism associated with imaging sensor 308. Then, image-acquisition module 332 may store images 344, timestamps 346 and/or spatial-position information 348 in memory 324.

Furthermore, when an imaging sensor 308 is pointed at the one of locations 340, the user may activate an image-activation mechanism associated with imaging sensor 308. When this occurs, image-acquisition module 332 may store reference information 350 (such as a reference timestamp and/or reference spatial-position information).

In addition, extraction module 334 may analyze images 344 to extract information 352 proximate to the one of locations 340 on document 342. For example, extracted information 352 may be extracted using optical character recognition. Note that the contributions of images 344 during the analysis may be specified by weights 354 associated with images 344. These weights may be based on spatial and/or temporal distance between a given image in images 344 and the one of locations 340. Alternatively, weights 354 may be based on differences between information 352 extracted from the given image and the other images.

In some embodiments, the analysis is based on historical information 356 previously extracted from one or more other documents 358. For example, if similar information has been previously extracted from another instance of the document, then this previously extracted information can be used during the analysis.

Figure 4:
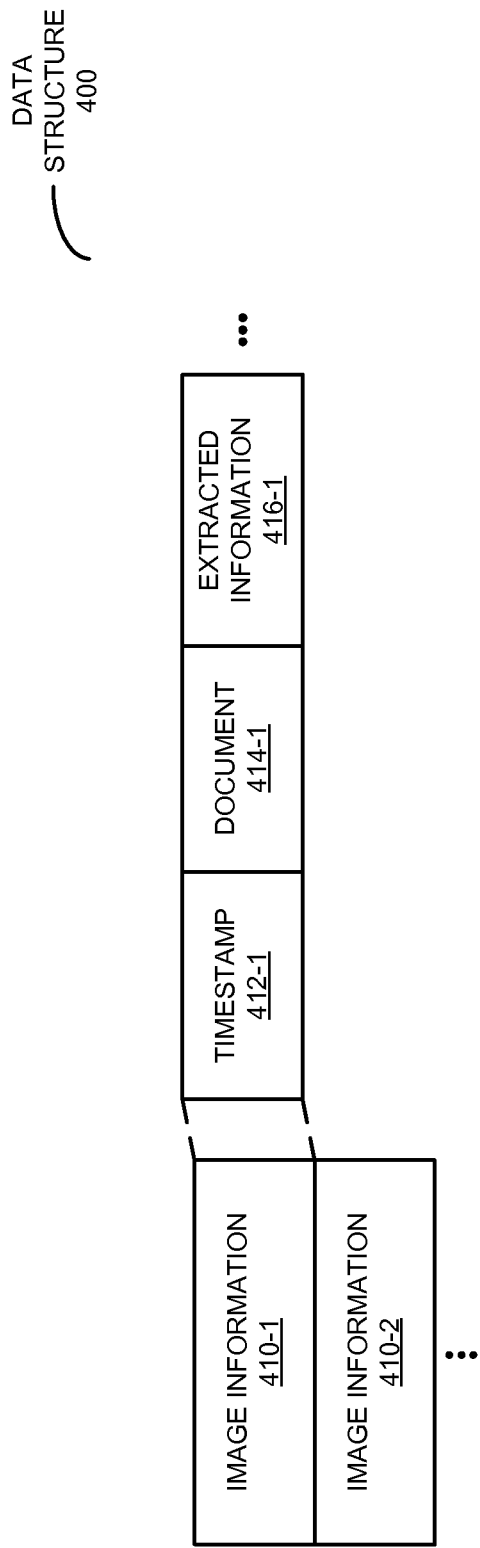
FIG. 4 is a block diagram illustrating a data structure for use with the electronic device of FIG. 3 in accordance with an embodiment of the present disclosure.

The history information, as well as information about the document, the images, the points of interest, the focal length and/or the exposure setting (such as a time duration that light is captured by the imaging device), may be included in a data structure. This is shown in FIG. 4, which presents a data structure 400 that includes image information 410 associated with the information-extraction technique. In particular, image information 410-1 includes: a timestamp 412-1, a document 414-1, and/or extracted information 416-1.

Referring back to FIG. 3, after information 352 is extracted, extraction module 334 may optionally erase images 344, timestamps 346 and/or spatial-position information 348. Additionally, extracted information 352 may subsequently be used by financial application 330. For example, financial application 330 may use information 352 to perform a financial calculation and/or to complete a financial form (such as an income-tax return).

Because information in electronic device 300 may be sensitive in nature, in some embodiments at least some of the data stored in memory 324 and/or at least some of the data communicated using communication module 328 is encrypted using encryption module 336.

Instructions in the various modules in memory 324 may be implemented in: a high-level procedural language, an object-oriented programming language, and/or in an assembly or machine language. Note that the programming language may be compiled or interpreted, e.g., configurable or configured, to be executed by the one or more processors 310.

Although electronic device 300 is illustrated as having a number of discrete items, FIG. 3 is intended to be a functional description of the various features that may be present in electronic device 300 rather than a structural schematic of the embodiments described herein. In practice, and as recognized by those of ordinary skill in the art, the functions of electronic device 300 may be distributed over a large number of servers or computers, with various groups of the servers or computers performing particular subsets of the functions. In some embodiments, some or all of the functionality of electronic device 300 may be implemented in one or more application-specific integrated circuits (ASICs) and/or one or more digital signal processors (DSPs).

Electronic device 300 may include one of a variety of devices capable of manipulating computer-readable data or communicating such data between two or more computing systems over a network, including: a personal computer, a laptop computer, a tablet computer, a mainframe computer, a portable electronic device (such as a cellular phone or PDA), a digital camera, a server and/or a client computer (in a client-server architecture). Moreover, electronic device 300 may be capable of communication via a network, such as: the Internet, World Wide Web (WWW), an intranet, a cellular-telephone network, LAN, WAN, MAN, or a combination of networks, or other technology enabling communication between computing systems.

In some embodiments one or more of the modules in memory 324 (such as image-acquisition module 332) may be associated with and/or included in financial application 330. This financial application may include: Quicken™ and/or TurboTax™ (from Intuit, Inc., of Mountain View, Calif.), Microsoft Money™ (from Microsoft Corporation, of Redmond, Wash.), SplashMoney™ (from SplashData, Inc., of Los Gatos, Calif.), Mvelopes™ (from In2M, Inc., of Draper, Utah), and/or open-source applications such as Gnucash™, PLCash™, Budget™ (from Snowmint Creative Solutions, LLC, of St. Paul, Minn.), and/or other planning software capable of processing financial information.

Moreover, financial application 330 may include: QuickBooks™ (from Intuit, Inc., of Mountain View, Calif.), Peachtree™ (from The Sage Group PLC, of Newcastle Upon Tyne, the United Kingdom), Peachtree Complete™ (from The Sage Group PLC, of Newcastle Upon Tyne, the United Kingdom), MYOB Business Essentials™ (from MYOB US, Inc., of Rockaway, N.J.), NetSuite Small Business Accounting™ (from NetSuite, Inc., of San Mateo, Calif.), Cougar Mountain™ (from Cougar Mountain Software, of Boise, Id.), Microsoft Office Accounting™ (from Microsoft Corporation, of Redmond, Wash.), Simply Accounting™ (from The Sage Group PLC, of Newcastle Upon Tyne, the United Kingdom), CYMA IV Accounting™ (from CYMA Systems, Inc., of Tempe, Ariz.), DacEasy™ (from Sage Software SB, Inc., of Lawrenceville, Ga.), Microsoft Money™ (from Microsoft Corporation, of Redmond, Wash.), Tally.ERP (from Tally Solutions, Ltd., of Bangalore, India) and/or other payroll or accounting software capable of processing payroll information.

Electronic device 300 may include fewer components or additional components. Moreover, two or more components may be combined into a single component, and/or a position of one or more components may be changed. In some embodiments, the functionality of electronic device 300 may be implemented more in hardware and less in software, or less in hardware and more in software, as is known in the art.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic-device-implemented method for extracting information from a document, comprising:
   providing an instruction to a user to point an imaging device, which is integrated into the electronic device, at a location on the document;
   after providing the instruction and before the user activates an image-activation mechanism associated with the imaging device, capturing multiple images of the document at an image capture rate, wherein the image capture rate is determined based on a stability measure associated with spatial-position information, the spatial-position information provided by a sensor integrated with the electronic device, and wherein the spatial-position information is stable when remaining within a specified range for a specified time duration;
   storing the images with associated timestamps and the spatial-position information;
   receiving a signal indicating that the user activated the image-activation mechanism; and
   in response to the signal, analyzing optical character recognition (OCR) results for two or more of the multiple images to extract the information proximate to the location on the document, wherein the analyzing comprises comparing an OCR result for a first image of at least a portion of the document to OCR results for each of multiple adjacent images from the two or more of the images, wherein the adjacent images are taken from different angles; and
   when the OCR result for the first image differs from one or more of the OCR results for the adjacent images:
   selecting a set of images of the document captured by the imaging device by determining that a range of linear and angular data for the set of images is smaller than a range of linear and angular data for the adjacent images; and
   determining a correct OCR result for the information based on the OCR results for the set of images.

2. The method of claim 1, wherein the sensor includes one of: an accelerometer and a gyroscope.

3. The method of claim 1, wherein the images are captured without the user's knowledge.

4. The method of claim 1, wherein the document includes a financial document.

5. The method of claim 1, wherein the spatial-position information includes position information and orientation information.

6. The method of claim 1, wherein the method further comprises erasing the one or more images after performing the analysis.

7. The method of claim 6, wherein a given image in the one or more images is erased when spatial-position information associated with the location differs from given spatial-position information associated with the given image by a predefined amount.

8. The method of claim 1, wherein a contribution of a given image in the one or more images in the analysis is based on a corresponding weight; and
   wherein the weight is based on a difference between the given spatial-position information associated with the given image and spatial-position information of the location.

9. The method of claim 1, further comprising controlling image capture rates for the two or more of the images based on the spatial-position information for the two or more of the images.

10. The method of claim 1, further comprising controlling image capture rates for the two or more of the images based on rates of change of the spatial-position information.

11. The method of claim 1, further comprising adjusting size properties of a view finder for the electronic device based on a data type of the information, wherein the view finder is displayed on a screen of the electronic device.

12. A computer-program product for use in conjunction with an electronic device, the computer-program product comprising a non-transitory computer-readable storage medium and a computer-program mechanism embedded therein, to facilitate extraction of information from a document, the computer-program mechanism including:

instructions for providing an instruction to a user to point an imaging device, which is integrated into the electronic device, at a location on the document;

instructions for capturing multiple images of the document, which operate after the instructions are provided to the user and before receiving a signal indicating that the user activated an image-activation mechanism associated with the imaging device, wherein the multiple images are captured at an image capture rate, wherein the image capture rate is determined based on a stability measure associated with spatial-position information, the spatial-position information provided by a sensor integrated with the electronic device, and wherein the spatial-position information is stable when remaining within a specified range for a specified time duration;

instructions for storing the images with associated timestamps and the spatial-position information;

instructions for receiving a signal indicating that the user activated the image-activation mechanism; and instructions for analyzing optical character recognition (OCR) results for two or more of the images in response to the signal to extract the information proximate to the location on the document, wherein the analyzing comprises comparing an OCR result for a first image of at least a portion of the document to OCR results for each of multiple adjacent images from the two or more of the images, wherein the adjacent images are taken from different angles; and when the OCR result for the first image differs from one or more of the OCR results for the adjacent images:

selecting a set of images of the document captured by the imaging device by determining that a range of linear and angular data for the set of images is smaller than a range of linear and angular data for the adjacent images; and determining a correct OCR result for the information based on the OCR results for the set of images.

13. The computer-program product of claim 12, wherein the spatial-position information includes position information and orientation information.

14. The computer-program product of claim 12, wherein the computer-program mechanism further includes instructions for erasing the one or more images after performing the analysis.

15. The computer-program product of claim 14, wherein a given image in the one or more images is erased when spatial-position information associated with the location differs from given spatial-position information associated with the given image by a predefined amount.

16. The computer-program product of claim 12, wherein a contribution of a given image in the one or more images in the analysis is based on a corresponding weight; and wherein the weight is based on a difference between the given spatial-position information associated with the given image and spatial-position information of the location.

17. An electronic device, comprising:

a processor;

memory; and a program module, wherein the program module is stored in the memory and configurable to be executed by the processor to facilitate extracting information from a document, the program module including:

instructions for providing an instruction to a user to point an imaging device, which is integrated into the electronic device, at a location on the document;

instructions for capturing multiple images of the document, which operate after the instructions are provided to the user and before receiving a signal indicating that the user activated an image-activation mechanism associated with the imaging device, wherein the multiple images are captured at an image capture rate, wherein the image capture rate is determined based on a stability measure associated with spatial-position information, the spatial-position information provided by a sensor integrated with the electronic device, and wherein the spatial-position information is stable when remaining within a specified range for a specified time duration;

instructions for storing the images with associated timestamps and the spatial-position information;

instructions for receiving a signal indicating that the user activated the image-activation mechanism; and instructions for analyzing optical character recognition (OCR) results for two or more of the images in response to the signal to extract the information proximate to the location on the document, wherein the analyzing comprises comparing an OCR result for a first image of at least a portion of the document to OCR results for each of multiple adjacent images from the two or more of the images, wherein the adjacent images are taken from different angles; and when the OCR result for the first image differs from one or more of the OCR results for the adjacent images:

selecting a set of images of the document captured by the imaging device by determining that a range of linear and angular data for the set of images is smaller than a range of linear and angular data for the adjacent images; and determining a correct OCR result for the information based on the OCR results for the set of images.

\* \* \* \* \*